UNITED STATES PATENT OFFICE.

GEZA HARTMANN, OF SAN FRANCISCO, AND REINHARDT J. BUSCH, OF LOS ANGELES, CALIFORNIA.

METALLIC ALLOY.

1,020,757.  Specification of Letters Patent.  Patented Mar. 19, 1912.

No Drawing.  Application filed November 21, 1911. Serial No. 661,466.

*To all whom it may concern:*

Be it known that we, GEZA HARTMANN, citizen of Austria-Hungary, and REINHARDT J. BUSCH, citizen of the United States, residing at San Francisco and Los Angeles, respectively, in the counties of San Francisco and Los Angeles, respectively, and State of California, have invented certain new and useful Improvements in Metallic Alloys; and we do hereby declare the following to be a full, clear, and exact description of the invention, such as will enable others skilled in the art to which it appertains to make and use the same.

This invention relates to metallic alloys, more particularly such used as solder, its object being to provide a solder for joining together parts of aluminum and also for joining aluminum to other metals.

The invention consists particularly of the alloy composed as hereinafter set forth and of the process of compounding the ingredients of the alloy.

The metallic alloy devised for these purposes is composed of vanadium, aluminum, antimony, bismuth, magnesium and tin, and the best results are obtained when these ingredients are compounded in the following proportion:—of aluminum fifteen and one half per cent.; of antimony seven per cent.; of bismuth nine per cent.; of vanadium one fourth of one per cent.; of magnesium two and one fourth per cent.; of tin sixty-six per cent.; bearing in mind that the metals to be used shall be of the quality known in the arts as pure.

In preparing the alloy place the correct portion of vanadium in a covered graphite crucible. When it is thoroughly melted add, in the order given, correct portions of bismuth, aluminum, antimony and magnesium and cover with charcoal powder in order to exclude the air. Stir thoroughly as each metal is added and when the above metals are thoroughly melted and mixed, add the proper portion of tin. When all the metals are melted and heated until the mass assumes an orange color, clean out the scum, remove the charcoal powder and pour the compositon into forms or molds. During the process of mixing, the compound must be kept at uniform heat to insure evenness of quality. The parts to be soldered together must first be thoroughly cleaned and this is best accomplished by heating the parts and brushing the surfaces of the fracture with a steel file or a wire brush. The parts to be soldered are kept uniformly heated and some of the solder is applied and spread upon the parts to be joined with a soldering iron, or other tool adapted to the work. When the first small portion of solder has been joined to the broken parts, or piece to be repaired, enough solder should be applied to this base to make a smooth joint. When thoroughly cooled the solder can be rubbed down and finished to match the original work by use of files, or steel brushes and sand cloth, or buffing wheels. This solder has proven to be stronger, more durable, and will stand more strain than many of the original aluminum castings, and lapse of time does not affect its strength or efficiency. In compounding the ingredients the proportion may be slightly varied without changing the scope of the invention.

We claim as our invention:

1. A metallic alloy of vanadium, aluminum, antimony, bismuth, magnesium and tin, compounded substantially in the proportion stated and for the purpose specified.

2. A metallic alloy compounded of fifteen and one half (15½) per cent. of commercially pure aluminum; seven (7) per cent. of commercially pure antimony; nine (9) per cent. of commercially pure bismuth; one fourth of one (¼ of 1) per cent. of commercially pure vanadium; two and one fourth (2 and ¼) per cent. of commercially pure magnesium and sixty-six (66) per cent. of commercialy pure tin.

3. The process of compounding the hereinbefore described metallic alloy, consisting (1) in melting vanadium in a covered graphite crucible; (2) adding to the molten vanadium the bismuth, aluminum, antimony and magnesium, in the order given, and stirring thoroughly as each metal is added; (3) covering the metals in the crucible with charcoal powder; (4) when the above metals are thoroughly melted and mixed, adding the tin; (5) keeping at a uniform heat until the mass assumes an orange color, then removing the scum and charcoal and pouring into the proper molds.

In testimony whereof we affix our signatures, in presence of two witnesses.

GEZA HARTMANN.
REINHARDT J. BUSCH.

Witnesses as to Geza Hartmann:
A. K. DAGGETT,
C. L. CRUMP.

Witnesses as to Reinhardt J. Busch:
E. C. PRIES,
M. A. TRACY.